July 30, 1968  P. H. COVERT ET AL  3,395,061
METHOD AND APPARATUS FOR MAKING MICROFICHE
Filed March 2, 1964
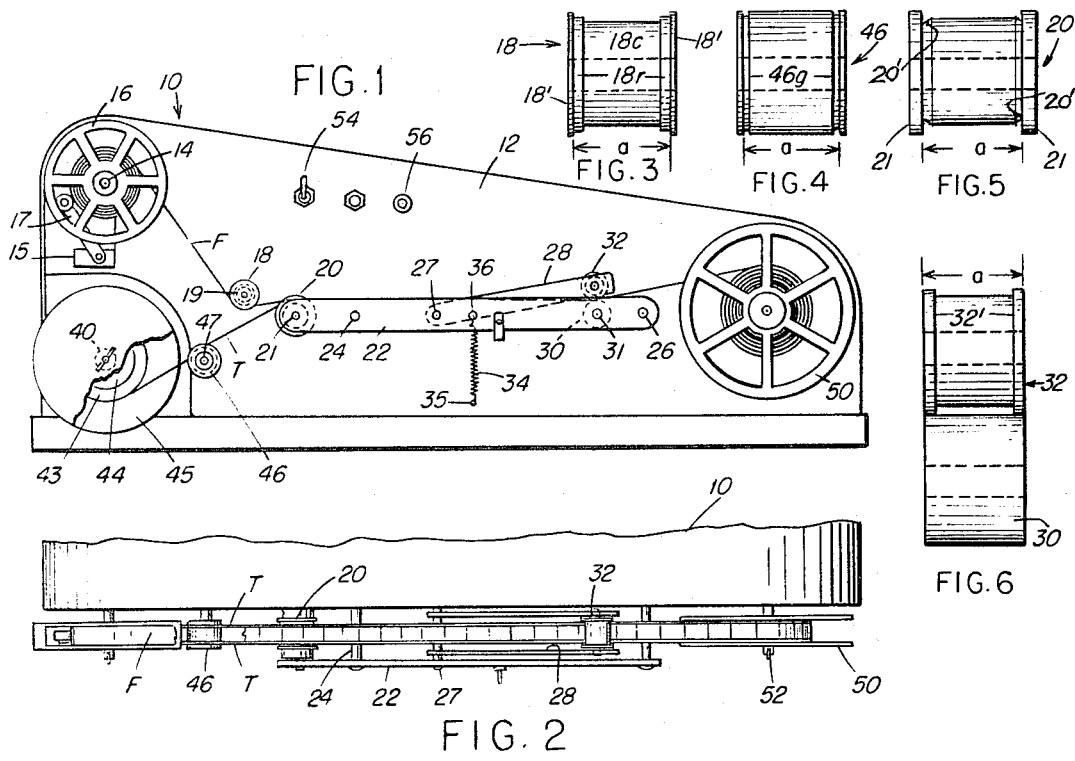
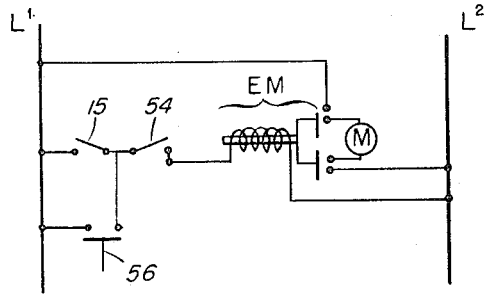
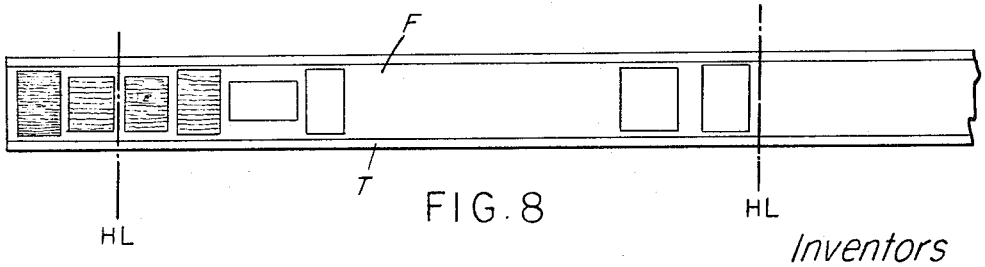
Inventors
Peter H. Covert
Jack J. Gilbert
By their attorneys
Howson and Howson.

United States Patent Office 3,395,061
Patented July 30, 1968

3,395,061
METHOD AND APPARATUS FOR MAKING
MICROFICHE
Peter H. Covert, Pomona, and Jack J. Gilbert, Suffern,
N.Y., assignors to Atlantic Microfilm Corporation,
Spring Valley, N.Y., a corporation of New York
Filed Mar. 2, 1964, Ser. No. 348,427
12 Claims. (Cl. 156—249)

ABSTRACT OF THE DISCLOSURE

Exposed microfilm from a reel passes around a guide roller while parallel spaced narrow tapes from another reel and having adhesive coating on both sides pass around another guide roller. The tapes are brought in contact with opposite edge portions of the same face of the film and then are subjected to pressure between idler and pressure rolls to make the tapes adhere firmly to the film. The tapes have protective strips on one face so that the composite film with tapes applied can be rolled up on a take-up roll.

---

This invention relates to machines and methods for preparing microfiche, namely sheets or plates having thereon a series of pictures, one following the other in one direction, and several of said series being side by side on the fiche.

More particularly, the invention relates to microfiches and to a method and apparatus for making the same. In accordance with the invention, a reel or long length of microfilm is prepared, as hereinafter described, in a series of steps by units of the apparatus, or by hand, in the course of which it is cut into predetermined lengths which are caused to adhere to a transparent sheet in side by side relation.

A reel of microfilm conventionally contains individual pictures of a given subject-matter spaced along a 16 mm. film strip in a series. A given original subject may comprise any number of individual sheets or pages of various sizes. Because of this, the length of each picture may vary, depending on the length of original document which has been photographed. Conventional microfilm cameras and photographic equipment measure the length of film for a picture proportionately to the length of the document photographed; and when the end of the document is reached, the film stops moving. A predetermined distance is automatically measured between each picture taken, which appears as a clear space between pictures, when the film is developed.

In preparing microfiches, customarily and desirably a series of pictures appear on a thin sheet, preferably 5" x 3¼", of clear acetate or like flexible transparent sheet material which is stamped or cut out from larger sheets or strips. Heretofore, the pictures have been placed on the 5" x 3¼" plates or fiches by photographic printing after the pictures have been taken on 16 mm. rolls or microfilm. This has been a relatively expensive procedure and time-consuming process.

Thus, the present invention has for an object a faster less expensive method and apparatus for preparing microfiches, which is adapted for use by individuals and organizations which deal in either large or small volume of production and which is capable, particularly, of making individual fiches economically.

Another more specific object is to provide a unitary mechanism for applying automatically, along the opposite edges of any length or reel or strip of microfilm, narrow ribbons or tapes which are coated on both sides with adhesive, preferably pressure-sensitive adhesive. A related object is to provide such a mechanism which is individually usfeul, but which is particularly useful as a unit in practice of the invention.

This invention also has for an object a method and appartaus for mechanically and automatically preparing a developed roll of microfilm for adhesion to a transparent plate or small sheet, such as by the aforesaid unit, and then applying the prepared film, mechanically or manually, in cut lengths side by side, to the plates to complete a microfiche.

Other objects and advantages will appear as the invention is described in connection with the accompanying drawings.

In the drawings:

FIG. 1 is a side elevation view of a machine embodying the invention showing the first unit thereof for applying ribbons of adhesive tape to opposite edges of a film.

FIG. 2 is a plan view, partly broken away, of the unit of the invention illustrated in FIG. 1.

FIG. 3 is an enlarged detail view of the film guide wheel used in said first unit.

FIG. 4 is an enlarged detail view of the tape guide wheel used in said first unit.

FIG. 5 is an enlarged detail view of the film and tape joining wheel used in said first unit.

FIG. 6 is an enlarged detail view of the pressure rolls used in said first unit.

FIG. 7 is a schematic diagram of the electric circuit controlling the stopping and starting of said first unit.

FIG. 8 is a plan view of a film strip as prepared by the machine of FIGS. 1–7.

Referring to the drawings, a machine or unit, as illustrated in detail in FIGS. 1–6, is designed to apply very narrow strips of tape continuously to opposite edges of one face of previously exposed and developed microfilm as it is withdrawn from a supply reel. The tape is coated with adhesive, preferably pressure sensitive adhesive, on both faces.

The adhesive tape is preferably a cellulose or other synthetic plastic tape which has been slit to the proper width. The tape strips are preferably about 1/16 of an inch wide when applied to 16 mm. film and are fed from reels having an uncoated protective strip or liner adhered to one of the adhesive faces so as to separate adjacent convolutions of the tape to keep them from sticking together.

The machine may comprise a housing 10 having a flat vertical side wall 12 on which are mounted the parts of the mechanism which carry the reels of microfilm and adhesive tape and feed them through to a take-off reel. A motor (not shown) and its electrical circuitry for driving the mechanism to conduct the film and tape through the mechanism is within the housing together with conventional friction slip clutches, as will hereinafter more fully appear. The housing may be made of any suitable material, sheet aluminum being particularly satisfactory because of its light weight and ease with which it can be worked.

At one end (the upper left as viewed in FIG. 1) of the vertical wall 12, an axle 14 is fixedly mounted, upon which may be removably secured in conventional fashion, a conventional reel 16 having microfilm F wound on it. A micro-switch 15 having operating arm 17 is mounted on the wall 12 in position for its end to be spring pressed against the film supply on the reel 16 so that when the supply becomes exhausted, the switch arm movement will open the switch and break the circuit to a holding coil of a conventional electromagnetic relay switch causing opening of the motor circuit in conventional fashion.

From the film reel 16, the film is trained around and beneath a first guide roller 18 having guide flanges 18' spaced equally to the width *a* of the film. This film-guide roll 18 is mounted loosely on an axle 19 supported from the vertical wall 12 at a lower level than the reel 16 and along toward the exit end of the housing. This film-guide roller 18 has peripheral ridges 18r adjacent the flanges so that only the edges of the film will touch the roller as the film passes around the roller. In this way, the central portion of the film bearing the emulsion surface does not touch the central portion 18c of the idler roller surface so that the emulsion surface will not be scratched or otherwise defaced or damaged.

From the film-guide roll 18, the film is fed over a second member which, in the form shown FIGURE 5, is a roller 20 mounted loosely on an axle 21 supported on one end of a support bar 22 and between it and the vertical housing wall 12 as hereinafter more fully described. The roller 20 is cylindrical with guide flanges 21 at opposite sides spaced equal to the film width *a*.

The supporting bar 22 extends horizontally lengthwise of the housing 10 along its midportion, and is mounted in spaced parallel relation to the housing wall 12 by two mounting bolts or struts 24 and 26 positioned near opposite ends of the bar.

Beneath the film supply reel 16, a non-rotatable axle 40 is affixed to the side wall 12 of the housing. On axle 40, a two-part nylon spool is mounted and held stationary so that it does not rotate. The spool is provided with a hub 44 from which extend flanges 45 to hold on the hub two reels 43 of thin double-faced adhesive tape T which are mounted upon the hub. These reels of tape are of width approximately equal to the usual unexposed or clear portions of the film. The tapes from spools 44 are fed over a tape-guide roller 46 rotatably mounted upon an axle 47 which, in turn, is mounted upon the side wall 12 of the housing between the axle 40 and the guide roller 18, but at a point below the roller 18.

The roller 46 is cylindrical with spaced peripheral grooves 46g formed adjacent its ends of width equal to the width of the adhesive tapes. The adhesive tapes are trained over the guide roller 46 and in the grooves 48 which, thus, guide and position the tapes as they are fed. Preferably the outer walls of the grooves are spaced apart a distance *a* equal to the width of the film.

From the guide roller 46, the adhesive tapes are then trained over the roller 20, but beneath the film F. To prevent wandering of the tapes from flanges 21 and from the edges of the film, the roller 20 is tapered inwardly towards its axis as at 20' from a point about ⅛" from each flange 21 at a small angle, approximately 5°. The tapes become adhered or tacked to the film F by gentle pressure due to the fact that the bottom of the periphery of the upper or film-guide roller 18 is below the upper periphery of the film-and-tape-joining roller 20. From the tacking member 20, the film with the adhesive tapes gently adhered to its edges is fed over feed roller 30 and under a pressure roller 32, as hereinafter described.

For drawing the film and adhesive tapes through the unit, a motor driven shaft 31 is supported in bearings in the support bar 22 and in the housing wall 12. On the motor-driven shaft is fixedly mounted a rubber covered cylindrical roller 30 over which the film is trained from the second roller 20.

For causing the adhesive tapes to adhere firmly to the film edges and to hold the firm firmly against the motor driven roller 30, the following mechanism is provided.

Mounted on the supporting bar 22 between the struts 24 and 26 and between the side wall 12 and bar 22 is a pressure arm 28. The pressure arm 28 is fabricated from a pair of spaced parallel identical links.

In order to provide a pivot for one end of the pressure arm, a pivot pin 27 extends between the support bar 22 and wall 12 and through said end of the pressure links.

Between the links of the pressure arm 28 at the end opposite its pivot, the pressure-roller 32 is mounted which normally is pressed by a spring 34 against the motor driven feed-roller 30 over which it lies. One end of the spring 34 is anchored to a pin 35 affixed to the housing wall 12 while the other end is anchored to a pin 36 extending between the links of the arm 28 at a point between its pivot 27 and the pressure-roller 32.

The pressure roller 32 (FIG. 6) has annular collars or ridges 32' formed adjacent its side edges of width approximately equal to the tapes so as to apply pressure to the tapes and film against the motor-driven roller 30. This causes the tapes and film to be firmly adhered together.

Although the adhesive tape is adhesively coated on both sides, the underside of the tapes, that is the side which touches the guide roller 46 and film-and-tape-joining roller 20, is protected by an uncoated strip or film of cellulosic or other synthetic plastic material which can be pulled away or removed later, but which remains adhered while the tapes and film pass through the first unit.

From the pressure roller 30, the film with the tapes adhered to its edges is fed to a take-off reel 50 mounted upon a spindle 52. This spindle is driven through a friction slip clutch (not shown) from the motor (not shown) within the housing 10. The spindle 52 turns at a speed slightly faster than the tape is fed to it by the motor-driven feed roll 30 so that the spindle tends to pull the tape along or go faster than the tape.

The motor which drives all the rotating spindles and parts is controlled by an "On"-"Off" conventional toggle switch 54 in series with the coil of an electromagnetic contractor EM (FIG. 7) and with the micro-switch 15. Thus, when there is film on the film supply reel 16, the toggle switch will be closed and, upon closure of the control switch 54, the motor will be energized by the closing of the electromagnetic switch EM.

When the film on the supply reel 16 reaches the point of exhaustion, the micro-switch 15 will open before the film supply is completely exhausted. In order to operate the unit manually until the film supply is completely exhausted, a push-button switch 56 is shunted around the micro-switch. By pressing upon the push-button switch 56, the motor will run so long as the switch 56 is manually held closed.

The motor and reduction gearing to the driven shaft 31 and to the shaft 52 of take-off reel 50, being not visible within the casing 10, need not be described as they are conventional and their structure and operation are known to those skilled in the art.

Upon completion of the passage of the film through the unit, the take-off reel may be removed.

The prepared film from the take-off reel may now be unwound by an attendant who will, as the film is unwound, peel off the protective liner or cover-strip from the adhesive tapes which are adherent to the edges of the film. This exposes the adhesive on the outer surface of the tapes.

The attendant then cuts off pieces of 5 inches or less from the microfilm and applies them one by one and side by side along the length of a 5" x 3¼" precut sheet or fiche of transparent acetate or other transparent synthetic plastic material, beginning at one side edge and working across the width as each additional 5-inch length is added.

The cut 5-inch lengths of film are caused to adhere to the sheet by pressing them against the sheet manually or otherwise, along their taped edges. The result is a fiche comprising the transparent flexible acetate base sheet, plate or support on which are adhered in side by side relationship film strips of approximately 5-inch length running longitudinally of the base sheet, each strip being adhered to the sheet by the narrow adhesive tapes or ribbons running along its edges. The film strips and the acetate sheet are thus each adhered to the double-faced adhesive tapes rather than to each other directly.

Alternatively, the taped film may be cut into five-inch lengths before the protective liner or cover strip is peeled; and the peeling off of the protective strip may be done just prior to applying the film to the acetate base sheet.

A machine or unit for peeling the protective strip and applying the film to the base sheet is described and claimed in copending application Ser. No. 351,714, entitled "Apparatus for Making Microfiche," filed Mar. 13, 1964, now Patent No. 3,347,734.

Modifications within the scope of the invention will occur to those skilled in the art. Therefore, the invention is not limited to the specific embodiment illustrated and described.

What is claimed is:

1. The method of preparing microfiches comprising the steps of applying along the opposite edges of one face of a strip of developed, image-bearing microfilm narrow ribbons of tape which are coated on both sides with pressure-sensitive adhesive, placing the film over a transparent sheet with the taped side of the film facing the sheet, cutting off from the film strips whose lengths are approximately equal to the length of said transparent rectangular sheet, successively placing said cut strips of film over said sheet side by side with the taped side of the film facing the sheet, and pressing the film strips against the sheet to cause adherence of the film to the sheet.

2. The method of preparing microfiches comprising the steps of applying along the opposite edges of one face of a strip of developed, image-bearing microfilm narrow ribbons of tape which are coated on both sides with pressure-sensitive adhesive, the side of the adhesive tape facing away from the film having a protective covering strip adhered thereto, cutting off from the film strips whose lengths are approximately equal to the length of a transparent rectangular sheet, successively placing said cut strips of film over said sheet side by side with the taped side of the film facing the sheet, peeling off said protective covering strip at any time prior to adherence of the film to the sheet, and applying pressure to the film strip to secure it to the sheet.

3. A machine for applying double coated adhesive strips to opposite edges of microfilm comprising a support for a roll of film, a support for two parallel rolls of narrow strips of tape coated on both sides with adhesive, a tacking member having guide flanges at opposite sides guiding said parallel strips and having a central cylindrical portion over which said film passes, said strips being joined to the film while passing over said tacking member, roller means engaging the joined film and strips and pressing them together, said roller means having spaced annular collars of greater diameter than the central portion of that roller so as to press the joined strips against the film without engaging the central image-bearing portion of the film, and means to draw said film and strips through the machines.

4. A machine as claimed in claim 3 having a film guide roller between said film roll support and said tacking member, said film guide roller having spaced cylindrical ridges supporting the edges of the film with the image-bearing portion of the film out of contact with that roller.

5. A machine as claimed in claim 3 wherein the central portion of said tacking member is tapered from adjacent each flange toward the axis of the roll to keep said tapes from wandering.

6. A machine as claimed in claim 5 having a film roll guide roller between said film support and said tacking member, said film guide roller having spaced cylindrical ridges supporting the edges of the film with the image-bearing portion of the film out of contact with that roller.

7. A machine as claimed in claim 5 having a take-off reel for the laminated film and strips, and wherein the means to draw said film through the machine comprises means driving the roller with the resilient periphery, and means driving take-off reel at a speed tending to draw the laminated film and strips faster than fed by said resilient roller.

8. A machine as claimed in claim 3, including means to drive said take-off reel, and a slip clutch between said take-off reel and its driving means.

9. A machine as claimed in claim 3 in which the other of said cooperating rollers has a resilient periphery.

10. A machine as claimed in claim 3 having take-off means for said taped film operating at a speed to pull the latter along.

11. A machine as claimed in claim 3 having electromotive means to drive said feeding means, means to de-energize said electro-motive means, and means responsive to the decrease in the amount of film on the reel support to activate said deenergizing spring means as the film becomes exhausted.

12. A machine for applying double coated adhesive strips to opposite edges of microfilm comprising a support for a roll of film, a support for two parallel narrow strips of tape coated on both sides with adhesive, a guide roll having spaced annular grooves in which said two strips are guided respectively, a second guide roll having guide flanges at opposite sides guiding said parallel strips and having a central cylindrical portion over which said film passes, said strips being joined to the film while passing over said second roll, a pair of cooperating rollers and means to press one against the other, one of said cooperating rollers having spaced annular collars of greater diameter than the central portion of that roller so as to press the joined strips against the film without engaging the central image-bearing portion of the film, the other of said cooperating rollers having a resilient periphery, and means to draw said film and strips through the machine.

References Cited

UNITED STATES PATENTS

| | | | |
|---|---|---|---|
| 2,191,704 | 2/1940 | Bennett | 156—230 |
| 2,422,676 | 6/1947 | Haman et al. | 156—554 |
| 2,614,349 | 10/1952 | Barnes | 156—201 |
| 2,628,929 | 2/1953 | Persoon et al. | 156—238 |
| 2,676,765 | 4/1954 | Kaplan | 242—68 |
| 2,718,975 | 9/1955 | Bower | 156—561 |
| 2,739,401 | 3/1956 | Balter | 40—158 |
| 3,106,324 | 10/1963 | Fritzinger | 225—26 |
| 3,138,476 | 6/1964 | Phipps | 117—68.5 |
| 2,250,583 | 7/1941 | Krauter. | |
| 2,673,643 | 3/1954 | Blank et al. | 156—302 |

EARL M. BERGERT, *Primary Examiner.*

R. KILLWORTH, *Assistant Examiner.*